(12) United States Patent
Hoke, Jr. et al.

(10) Patent No.: US 6,519,973 B1
(45) Date of Patent: Feb. 18, 2003

(54) GLASS MELTING PROCESS AND FURNACE THEREFOR WITH OXY-FUEL COMBUSTION OVER MELTING ZONE AND AIR-FUEL COMBUSTION OVER FINING ZONE

(75) Inventors: Bryan Clair Hoke, Jr., Bethlehem, PA (US); Kevin Alan Lievre, Allentown, PA (US); Aleksandar Georgi Slavejkov, Allentown, PA (US); Julian Leonard Inskip, Cheshire (GB); Robert Dean Marchiando, Twinsburg, OH (US); Robert Michael Eng, Irvine, CA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 09/534,905

(22) Filed: Mar. 23, 2000

(51) Int. Cl.$^7$ .................................................. C03B 5/16
(52) U.S. Cl. ...................... 65/134.4; 65/29.3; 65/29.15; 65/134.6; 65/136.3; 65/136.2; 65/355; 65/356; 431/10; 432/182; 432/159; 110/297
(58) Field of Search ............................... 65/29.13, 29.15, 65/134.4, 134.6, 136.3, 136.2, 355, 356; 431/10; 432/182, 159; 110/297

(56) References Cited

U.S. PATENT DOCUMENTS

| | | | |
|---|---|---|---|
| 1,552,116 A | * | 9/1925 | Cordes |
| 3,350,185 A | | 10/1967 | Rough |
| 3,592,623 A | | 7/1971 | Shepherd |
| 3,733,189 A | * | 5/1973 | Zurheide et al. |
| 3,951,635 A | | 4/1976 | Rough, Sr. |
| 3,998,615 A | * | 12/1976 | Gartz, Jr. et al. |
| 4,347,072 A | | 8/1982 | Nagaoka et al. |
| 4,473,388 A | | 9/1984 | Lauwers |
| 4,531,960 A | | 7/1985 | Desprez |
| 4,911,744 A | | 3/1990 | Petersson et al. |
| 5,116,399 A | | 5/1992 | Lauwers |
| 5,139,558 A | | 8/1992 | Lauwers |
| 5,147,438 A | | 9/1992 | Castelain et al. |
| 5,158,590 A | | 10/1992 | Jouvaud et al. |
| 5,387,100 A | * | 2/1995 | Kobayashi |
| 5,417,732 A | | 5/1995 | Shamp et al. |
| 5,611,682 A | * | 3/1997 | Slavejkov et al. |
| 5,655,464 A | | 8/1997 | Moreau et al. |
| 5,755,846 A | | 5/1998 | Wagner et al. |
| 5,779,754 A | | 7/1998 | Bodelin et al. |
| 5,855,639 A | | 1/1999 | Ougarane et al. |
| 6,126,440 A | * | 10/2000 | Argent et al. |

FOREIGN PATENT DOCUMENTS

| | | | | |
|---|---|---|---|---|
| EP | 1077201 | 2/2001 | ........... | C03B/5/235 |
| WO | WO 99/31021 | 6/1999 | | |

OTHER PUBLICATIONS

A. Dietzel, "Chapter 22 Speeding up Glass Melting", Magazine by Industry, Inc., 1980 pp. 138–139.
Hope et al., "Oxygen–fuel Boosting on Float Furnaces", Air Products.
Proceedings of the 57$^{th}$ Conference On Glass Problems, Oct. 8–9, 1996, The Ohio State University.
C Baukal, "Oxygen Enhanced Combustion", Chapter 7 entitled "Glass", 1988 by CRC Press.
"Can Partial Conversion to Oxy–Fuel Combustion Be a Solution to Furnace Problems", McMahon, et al, Glass Industry/Dec. 1994, pp. 23–24.

* cited by examiner

*Primary Examiner*—Michael Colaianni
(74) *Attorney, Agent, or Firm*—Robert J. Wolff

(57) ABSTRACT

A process and furnace for melting glass is set forth wherein the majority of the combustion energy over the melting zone of the furnace is provided by oxy-fuel combustion while a majority of the combustion energy over the fining zone of the furnace is provided by air-fuel combustion. In many cases, it will be preferable to provide greater than 70% and up to and including 100% of the combustion energy over the melting zone by oxy-fuel combustion and greater than 70% and up to and including 100% of the combustion energy over the fining zone by air-fuel combustion. By proper tailoring of the combustion space atmosphere through oxy-fuel and air-fuel firing, the present invention can result in an improvement in glass productivity and quality. The present invention can be applied in the construction of a new furnace or can be applied to existing air-fuel furnaces.

38 Claims, 12 Drawing Sheets

GLASS MELTING PROCESS AND FURNACE THEREFOR WITH OXY-FUEL COMBUSTION OVER MELTING ZONE AND AIR-FUEL COMBUSTION OVER FINING ZONE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to a process and furnace for melting glass forming ingredients. In the typical glass melting furnace, or glass tank as it is commonly referred to, the raw glass making materials, termed batch, are charged into the melting zone of the furnace. Glass tanks are operated continuously and therefore there is an existing bath of molten glass, termed melt, in the melting zone onto which the raw material is placed. The molten glass and un-melted batch are collectively referred to as the charge. The raw batch may be charged into the tank by any of the well-known mechanical charging devices. In practice, the batch materials float on the surface of the molten bath forming a semi-submerged layer containing un-melted solids termed a batch blanket. The blanket sometimes breaks up to form separate batch piles or batch islands (also called rafts or logs). For the purposes of this disclosure, the section of the furnace containing significant unmelted batch solids floating on the surface of a molten glass bath is defined as the melting zone.

The glass tank usually consists of the melting zone and the fining zone. For the purpose of this disclosure, the fining zone is defined as that section of the furnace not containing significant un-melted batch solids floating on the surface of a molten glass bath. Foam or scum may be present on the surface of the molten glass bath in the fining zone or it may be clear, termed "mirror surface" glass. In the fining zone, glass is homogenized and defects, such as bubbles or "seeds" are driven out. Glass is continuously withdrawn from the fining zone. The melting zone and the fining zone of a glass tank may be present in a single chamber or the glass tank may consist of two or more connected and distinct chambers.

Glass has historically been melted in air-fuel furnaces where burners direct flames across molten glass and the exhaust gas from the flames is removed through heat recovery devices to improve the overall furnace efficiency, thereby reducing fuel consumption. Recuperators and regenerators are common heat recovery devices used in the glass industry. A recuperator is typically a metallic shell-and-tube-style heat exchanger that indirectly heats the combustion air with the heat removed from exhaust gases. In the case of regenerators, the exhaust gas passes through the regenerators transferring its heat to the checker packing or other heat storage media within the regenerator. The checker packing is generally constructed from refractory material. The regenerator may be a common chamber per each side of the furnace, a number of separate and distinct chambers attached to the furnace or may be incorporated into the burner supply ducting. The heated packing is used to preheat combustion air which is combined with fuel used to produce the flames during the firing cycle of the heating operation. These heat recovery devices are costly and sometimes limit the furnace life due to design limitations, failure caused by thermal shock to the refractory, corrosion, or plugging. Occasionally glass is melted in a unit melter which is a furnace without a heat recovery device to preheat combustion air.

In the case of regenerators, the thermal storage medium, i.e. the checkers, become plugged by condensed volatiles and particulates from the glass melting process, resulting in insufficient flow of combustion air to the ports. Consequently, glass manufacturers routinely clean out the checker packs to maintain air flow. The plugging problem is noticeably worse for the ports connected to the melting zone of the furnace. The buildup in the regenerator packing which is contacted by gases from the melting zone of the furnace is often viscous and difficult to remove. Controlling buildup of material on the checker packing of a regenerator is the subject of U.S. Pat. No, 5,840,093. The buildup in the down tank checkers which is contacted by gases from the fining zone of the furnace is drier and more powdery resulting in easier removal of the buildup. Because of the less aggressive attack, down tank checkers have been used for more than one furnace campaign.

Near the end of a furnace campaign, it is sometimes the case that the checkers become too badly degraded, at times even collapsing, and sufficient air flow is not possible even after a clean out. The problem usually manifests itself in the regenerator section receiving gases from the melting zone of the furnace. Oxygen enhanced combustion technologies have been used in these "crippled" air-fuel furnaces to extend the furnace life. While the oxygen enhanced combustion technologies do not prevent the checker plugging problem, they do provide a method to continue furnace operation, albeit sometimes with a higher operating cost.

Industrial oxygen has been used to enhance combustion in the glass industry for several decades. Oxygen enhanced combustion can be accomplished by (i) supplemental oxy-fuel burners, (ii) premixed oxygen enrichment of the combustion air, or (iii) lancing of oxygen to the port or burner. Supplemental oxy-fuel is the practice of installing one or more oxy-fuel burners into an air-fuel furnace. Premixed oxygen enrichment is the practice of introducing oxygen into the combustion air usually to a level of up to 30% total contained oxygen (i.e., 9% oxygen enrichment). The amount of oxygen enrichment is limited by materials compatibility issues in highly oxidizing environments. Lancing is the practice of strategically injecting oxygen through a lance into the combustion zone. These oxygen enhancing techniques are applied to furnaces with burners having standard air-fuel designs. The basic air-fuel furnace concept has not been significantly modified to apply the above mentioned oxygen enrichment technologies.

Supplemental oxy-fuel combustion has been applied to air-fuel glass furnaces and has shown benefits. One form of supplemental oxy-fuel combustion is commonly referred to as oxy-fuel boosting. Oxy-fuel boosting is a technology where oxy-fuel burners are added to an air-fuel furnace. Two locations for the oxy-fuel burners have been proposed: near the hot spot position and in the zero port position. Typically the oxy-fuel burners fire constantly, even during the reversal cycle of a regenerative furnace.

The rationale for putting the oxy-fuel burners in the hot spot position is to reinforce the hot spot with additional heat to positively influence the convective flow patterns in the glass melt and, as described in several patents, to affect the position of the batch-line. The overall glass flow pattern is strongly influenced by buoyancy driven flow and the temperature profile in the furnace is important for the buoyancy driven flow. Ultimately the glass quality is affected. This is why glass-makers control and monitor the temperature profile in a furnace.

Similar to the hot spot oxy-fuel boost, U.S. Pat. No. 3,592,623 discloses a process and furnace where at least part of the furnace heating is provided by an oxy-fuel flame from a position downstream of the hot spot. The combustion products of the flame impinge on the un-melted glass making materials (i.e. the batch) causing the un-melted materials to remain near the feed end of the tank until melted. An objective is to control the position of the un-melted batch material (batch-line) in the glass tank. The remaining heating is provided by air-fuel combustion as shown in the figures of '623.

U.S. Pat. No. 4,473,388 discloses an oxy-fuel boost process where the oxy-fuel flames cover substantially the whole width of the furnace and are directed at the batch-line.

U.S. Pat. No. 5,139,558 discloses a process where at least part of the furnace heating is provided by at least one flame from at least one oxy-fuel burner located in the roof of the furnace, the position of the burner being such that the tip of its flame is directed approximately at the batch-line. An objective of both of the '623 and '558 processes is to increase the melting rate of the solid glass forming materials and control the batch-line position.

Oxy-fuel firing over the down tank molten glass in a regenerative or recuperative air-fuel furnace is the subject of U.S. Pat. No. 5,116,399. The object of this disclosure is to use an oxy-fuel flame with velocity greater than 100 m/sec to sweep un-melted glass forming ingredients floating on the surface of the melt in the vicinity of the glass outlet to prevent any un-melted glass forming ingredients from entering the glass outlet. Use of supplemental oxy-fuel burners combined with the oxy-fuel burner for sweeping unmelted glass forming ingredients within the air-fuel furnace configuration is also disclosed.

Supplemental oxy-fuel boost of an air-fuel regenerative furnace is disclosed in U.S. Pat. No. 5,147,438 where the oxy-fuel auxiliary burner is bent, angled, or inclined to direct its flame toward the batch-line or in the vicinity of the batch-line.

As an alternative to the hot spot position, oxy-fuel boost can be placed at the charge end of a furnace. In a side-fired furnace, this is commonly referred to as the zero port position. It is the space between the charge end-wall and the first air-fuel port. The rationale for this location is higher heat transfer rates from the hot oxy-fuel flames to the cold batch. Zero port oxy-fuel boosting is a common method used by industry and is described in Hope and Schemberg (1997). This reference teaches that as a result of more intense radiant heat transfer to the cold batch from the oxy-fuel boost flame, earlier batch fritting and glazing occurs than is possible with just air-fuel melting. The percentage of oxy-fuel firing for the zero port boosting technology has been approximately up to 15% of the total firing rate and is often limited by the maximum allowable temperature of the superstructure refractory. Using zero port oxy-fuel boosting, production increases on the order of 5 to 10% have been achieved with simultaneous glass quality improvement.

U.S. Pat. No. 4,531,960 teaches zero port oxy-fuel boosting where the supplemental (auxiliary) oxy-fuel flames are surrounded with a current of auxiliary gas where the auxiliary gas is preferably air and directing the auxiliary gas towards the batch clods (un-melted batch piles or islands).

One of the objectives of the auxiliary gas is to eliminate the use of water cooling of the oxy-fuel burner which was a common feature of oxy-fuel burners at the time of the patent filing. Those skilled in the art of NOx technologies will readily appreciate that practice of this teaching would result in an increased NOx formation since the nitrogen from the air would mix in the high temperature oxy-fuel flame.

Practice of these supplemental oxy-fuel technologies without high NOx formation rates, requires special methodologies.

An extension of the supplemental oxy-fuel technologies would be to combine the zero port and hot spot oxy-fuel boosting to capture the benefits of improved melting in the melting zone and batch-line control. This process, however, is likely to particularly cause concern over an increase in the propensity for NOx formation because there will be more of the hotter oxy-fuel flames available to form NOx with the migrating nitrogen from the air-fuel combustion section. Thus, a process utilizing both air-fuel and oxy-fuel combustion in the same furnace without taking into consideration the problem of NOx formation would be an incomplete solution.

To minimize formation of NOx associated with increasing supplemental oxy-fuel in air-fuel furnaces, there has been a general trend in the glass industry to convert from air-fuel firing to full oxy-fuel firing. In this manner, the NOx forming nitrogen is eliminated as part of the feed to the burners. Because of this NOx issue and other issues, the move to full oxy-fuel is the obvious choice if increasing use of oxy-fuel is desired especially at levels suitable for an on-site generated supply of oxygen. In contrast to oxygen enhanced combustion technologies, significant modifications are made to a furnace to apply full oxy-fuel combustion in furnaces. In full oxy-fuel furnaces, air for combustion is replaced by industrial oxygen with purity typically between 90 and 100%. Heat recovery devices used in air-fuel furnaces such as regenerators and recuperators are generally not used after the furnace has been converted to oxy-fuel. Different burners and flow systems are used and the general layout of the burners and exhausts is almost always different than previous air-fuel furnace designs.

Full oxy-fuel firing in a glass furnace is a demonstrated and proven technology.

Eleazer and Hoke in chapter 7 titled Glass, of the publication *Oxygen-Enhanced Combustion*, Charles E. Baukal, Jr., Editor, 1998 pp. 215–236 report 110 full oxy-fuel conversions in North America. Implementation of full oxy-fuel combustion in glass furnaces is the topic of U.S. Pat. Nos. 5,417,732 and 5,655,464. Some of the benefits reported for oxy-fuel operation are; fuel savings due to improved furnace efficiency, production increase resulting from improved heat transfer, reduced electricity costs by substituting combustion energy for electric boost energy, extended furnace life by overcoming combustion air throughput limitations caused by plugged checkers or a failing recuperator, extended furnace life by substituting combustion energy for electric boost energy, thereby reducing refractory wear caused by electric boost, reduced pollutant emissions such as NOx, particulates, and carbon dioxide, improved glass quality resulting from improved furnace temperature profile, lower volatilization, better batch-line control, and decreased capital cost by reducing or eliminating post-treatment systems and/or heat recovery systems.

However, the use of full oxy-fuel is not without problems or concerns. The atmosphere generated by oxy-fuel firing over a glass melt has been found to be more aggressive to superstructure refractory than an air-fuel atmosphere. Several articles in the 57$^{th}$ Conference on Glass Problems in 1996 discussed the increased corrosion of superstructure refractory resulting from oxy-fuel firing. Consequently, new construction techniques and new materials of construction which are often more expensive, have been proposed for oxy-fuel fired furnaces. In addition to the obvious concern for furnace integrity, refractory corrosion can be detrimental to glass quality if the liquefied superstructure refractory gets into the glass.

Operators of oxy-fuel glass furnaces have reported an increase in foam on the glass surface as compared to air-fuel operation. Foam is believed to have a negative impact on heat transfer and on glass quality. Heat transfer is affected because foam has poor conductive properties. U.S. Pat. No. 3,350,185 addresses the problem of foam formation and the elimination thereof.

Increased heat transfer using oxy-fuel is the subject of PCT International Patent Application WO 99/31021 which describes-a roof-mounted oxy-fuel burner process and furnace to produce refined glass without the use of regenerators or recuperators. This application describes high level usage of oxy-fuel combustion with impingement on the batch surface in the melting zone of the furnace for increased heat transfer. This application teaches the use of at least one roof-mounted oxy-fuel burner in the fining zone for combustion proximate top surface melted raw glass-forming material to reduce the layer of foam from the melted glass surface to aid in refinement of the melted glass. At least one roof-mounted oxy-fuel burner in the fining zone is said to have been found to improve the quality of the glass moving forward into the forming area by removing surface defects such as incompletely reacted raw glass-forming material or insufficiently mixed surface materials by substantially raising the surface glass temperature, promoting melting and mixing. Furthermore, at least one downstream oxy-fuel burner provides a barrier to the forward flow of material, promotes natural convection currents within the molten glass causing hotter glass to flow backwards under the raw glass-forming material thereby preventing a forward surge of the molten glass, increasing the melting effect and increasing the glass temperatures in the fining zone. As this is a full oxy-fuel furnace technology, this patent application states that NOx emissions are reduced compared to an all air-fuel furnace technology.

The operation of a full oxy-fuel furnace depends on the constant availability of oxygen. Many of the larger oxy-fuel glass furnaces are supplied by oxygen generated on site using well-known cryogenic distillation or vacuum swing adsorption techniques. It is customary and, to date, the only method for backing up the supply of on-site generated oxygen by maintaining an inventory of liquid oxygen at the same site. Thus, when the on-site generation facility is taken off-line either due to a process problem or for routine maintenance, the inventory of liquid oxygen is utilized to supply the oxygen for the oxy-fuel combustion. This method of backing up the on-site generated oxygen requires large insulated tanks for storage of the oxygen in liquid form and vaporizers to enable the liquid oxygen to be converted into gaseous oxygen for use in the oxy-fuel process. It is conventional to utilize trucks to haul liquid oxygen to the site from a larger air separation facility. Utilizing liquid oxygen back-up with an on-site generated oxygen system permits the user to continue using an oxy-fuel process without interruption. An alternative technology, where air-fuel combustion, with and without oxygen enrichment, is used to back up an oxy-fuel furnace is described in co-pending U.S. Pat. No. Application Serial No. 09/420,215 filed Oct. 14, 1999.

Since the furnace efficiency changes over the life of the furnace using full oxy-fuel combustion and the glass production rate may vary over the furnace campaign, the associated oxygen generator is typically sized for the maximum planned usage rate. This results in an underutilized oxygen generator for a large percentage of the furnace campaign.

McMahon et al. (hereafter "McMahon") in an article entitled "Can Partial Conversion to Oxy-fuel Combustion be a Solution to furnace Problems" (Glass Industry, December 1994) teaches a partial conversion of an air-fuel furnace to an oxy-fuel furnace prior to and as part of a complete re-build to an oxy-fuel furnace. A key in McMahon is that the ports in the previous heat recovery system were left open in the converted section of the furnace's partially converted state, notwithstanding that oxy-fuel combustion does not require heat recovery. (Oxy-fuel combustion, burning hotter than air fuel combustion, does not require recovering heat from the combustion products exhausted from the furnace in order to preheat the combustion reactants and boost the combustion temperatures.)

Leaving the ports open in McMahon in the converted section was related to the control of NOx emissions. In particular, this allowed air to enter the converted section, thereby facilitating the aspiration principle whereby the entering air and furnace gases are integrated with the oxy-fuel burners such that the oxygen and fuel come into contact only at low concentrations, thereby yielding peak flame temperatures equal or lower than those of regenerative air/fuel flames, thereby reducing NOx. The air entering the converted section brings into question, however, whether oxy-fuel combustion (defined in the Application as combustion where the oxidant stream is between 50 and 100% oxygen and preferably between 90 and 100% oxygen) occurred in the converted section or, as is more likely according to Applicant's calculations, only "oxygen-enriched" combustion occurred in the converted section.

Leaving the ports open in McMahon in the converted section also mitigated the migration of combustion products from the converted section to the unconverted section, thereby impeding the batch volatiles (which are commingled with the oxy-fuel combustion products from the converted section) from entering the unconverted section and being exhausted from the unconverted section and subsequently plugging and/or corroding the heat recovery system needed for the unconverted section. Leaving the ports open in the converted section, however, also allows combustion products from the unconverted section to exhaust from the converted section, thereby allowing the nitrogen contained in the air used for the air-fuel combustion in the unconverted section to enter the converted section and mix with oxygen and subsequently form NOx.

None of the references discussed above teach a process or furnace with predominantly oxy-fuel combustion heating in the melting zone and predominantly air-fuel combustion heating in the fining zone.

BRIEF SUMMARY OF THE INVENTION

The present invention is a process and furnace for melting glass wherein the majority of the combustion energy over the melting zone of the furnace is provided by oxy-fuel combustion while a majority of the combustion energy over the fining zone of the furnace is provided by air-fuel combustion.

DETAILED DESCRIPTION OF THE INVENTION

Figure 1:
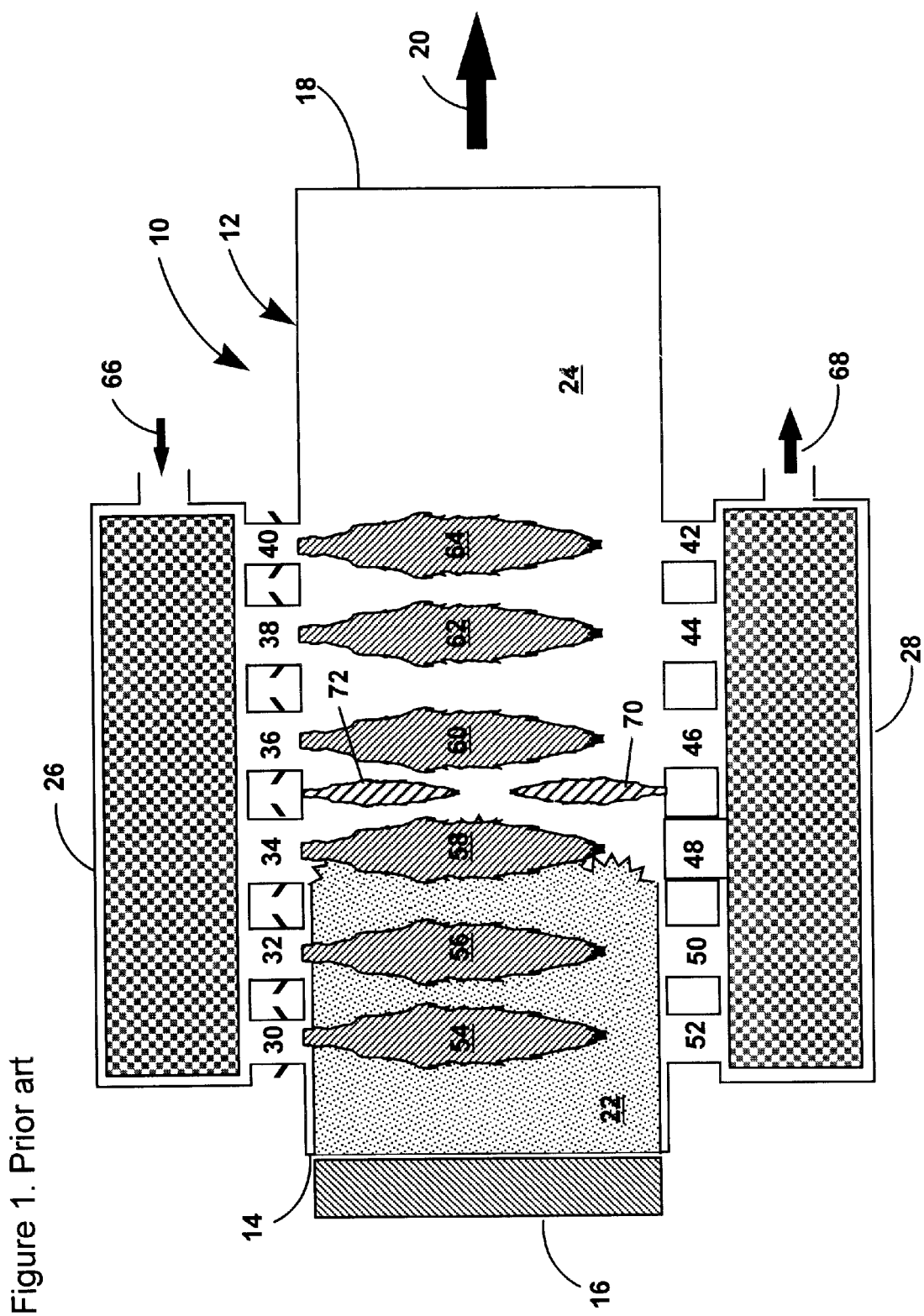
FIG. 1 is a schematic top view of a prior art furnace utilizing air-fuel combustion with oxy-fuel combustion boosting at the hot spot position.

The present invention is a process and furnace for melting glass wherein the majority of the combustion energy over the melting zone of the furnace is provided by oxy-fuel combustion while a majority of the combustion energy over the fining zone of the furnace is provided by air-fuel combustion. In many cases, it will be preferable to provide greater than 70% and up to and including 100% of the combustion energy over the melting zone by oxy-fuel combustion and greater than 70% and up to and including 100% of the combustion energy over the fining zone by air-fuel combustion. By proper tailoring of the combustion space atmosphere through oxy-fuel and air-fuel firing, the present invention can result in an improvement in glass productivity and quality. The present invention can be applied in the construction of a new furnace or can be applied to existing air-fuel furnaces.

For the purposes of this disclosure, oxy-fuel combustion is defined as combustion where the oxidant stream is between 50 and 100% oxygen and preferably between 90 and 100% oxygen. Air-fuel combustion is defined as combustion where the oxidant stream is between about 21% and 30% oxygen. Combustion energy is defined as the fuel heating value, typically expressed in Btu/lb or equivalent converted unit measure, multiplied by the mass flow rate of the fuel, typically expressed in lb/h or equivalent converted unit measure. Volumetric flow rates can be used with appropriate unit conversion using the density of a fuel gas.

The present invention's mixed air-fuel and oxy-fuel approach is contrary to conventional thinking since increasing oxy-fuel firing in an air-fuel furnace can lead to an increase in the propensity for NOx formation and the attendant problems relating thereto. (As per discussion in the Background Section, there is an increase in the propensity for NOx formation because there are more of the hotter oxy-fuel flames available to form NOx with the migrating nitrogen from the air-fuel combustion). Indeed, the main purpose of U.S. Pat. No. 5,655,464 cited in the Background Section herein is to prevent air from entering the melting/refining compartment (melting and fining zone) of an oxy-fuel furnace. The present invention has unexpectedly found however that there are heretofore unrecognized benefits of a mixed air-fuel and oxy-fuel combustion system and with proper management of the increased propensity for NOx formation, these benefits can offset the propensity for NOx formation.

As compared to full oxy-fuel technologies, the present invention provides for glass melting with reduced or eliminated full oxy-fuel problems such as refractory wear, oxygen backup supply, glass foaming, and full utilization of on-site generated oxygen.

As compared to air-fuel technologies, the present invention provides for glass melting with reduced or eliminated air-fuel problems such as heat recovery device life, batch stability, and pollutant emissions through the well-placed use of oxy-fuel flames and exhausts.

In addition, Applicants believe that higher productivity and enhanced melting of the batch is achievable by the present invention in view of limited data by A Dietzel. Dietzel, in chapter 22 titled Speeding up Glass Melting, of the publication *The Melting Process in the Glass Industry* (Alexis G. Pincus, Editor, 1980 pp. 138–139), has shown and reported back in 1943 that water vapor reduces the temperature where the batch begins to melt and therefore speeds the batch melting process. Fluxing agents, in this case water, are typically added to the batch to reduce the temperature where the first melt is formed. Enhanced mass transfer and chemical reaction rates result from the early liquid phase formation. This improves the overall glass melting process and improves glass quality.

Whereas air-fuel combustion will provide more total water molecules in the combustion space by virtue of a required higher equivalent firing rate for energy transferred to a charge, oxy-fuel combustion will provide a higher concentration of water in the combustion space. Although increased water concentration proximate the batch can also be accomplished by wetting the incoming batch with water or injecting steam into the combustion space, these techniques result in decreased fuel efficiency as compared to the oxy-fuel combustion approach.

Figure 2:
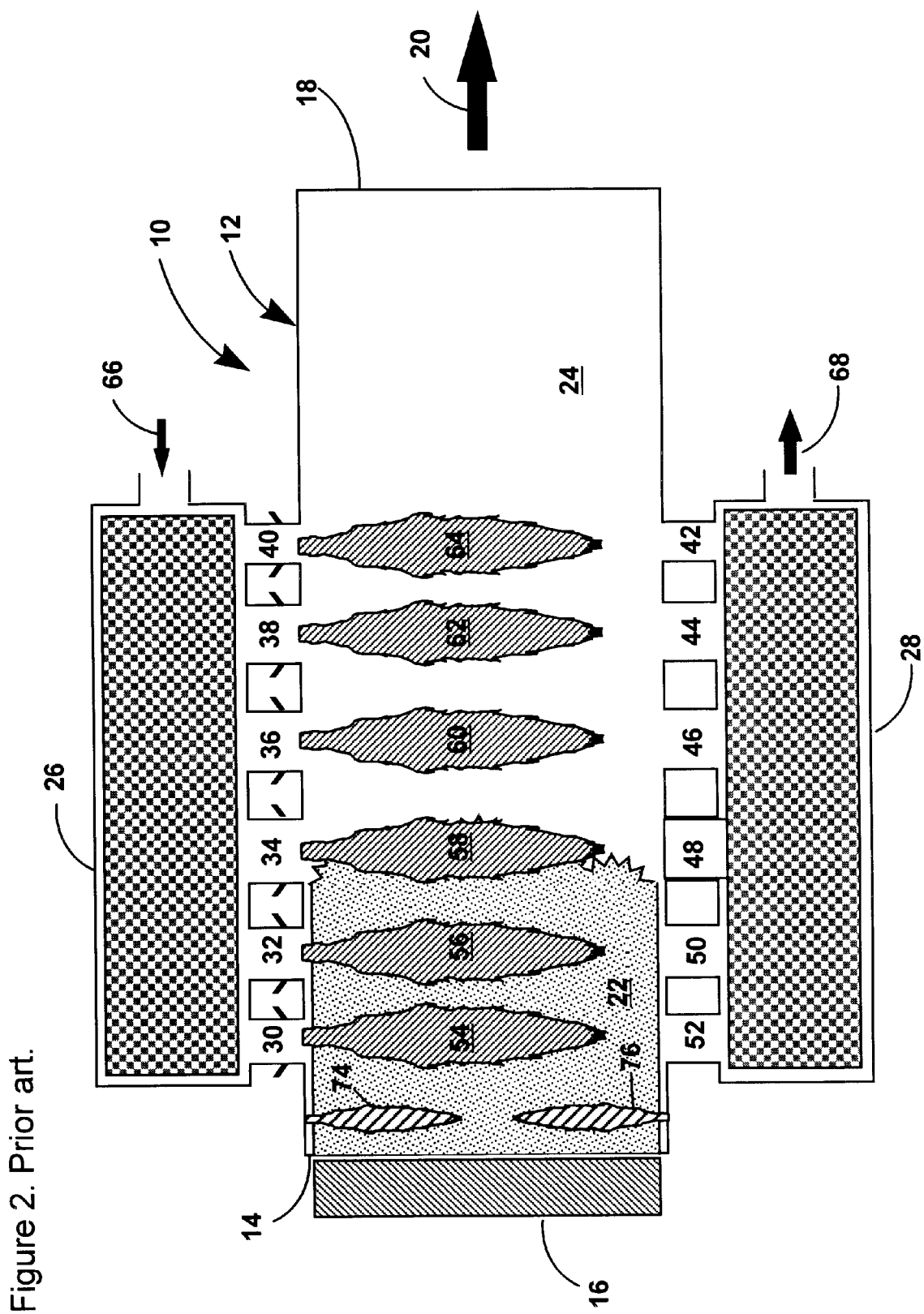
FIG. 2 is a schematic top view of a prior art furnace utilizing air-fuel combustion with oxy-fuel combustion boosting at the zero port position.
Figure 3:
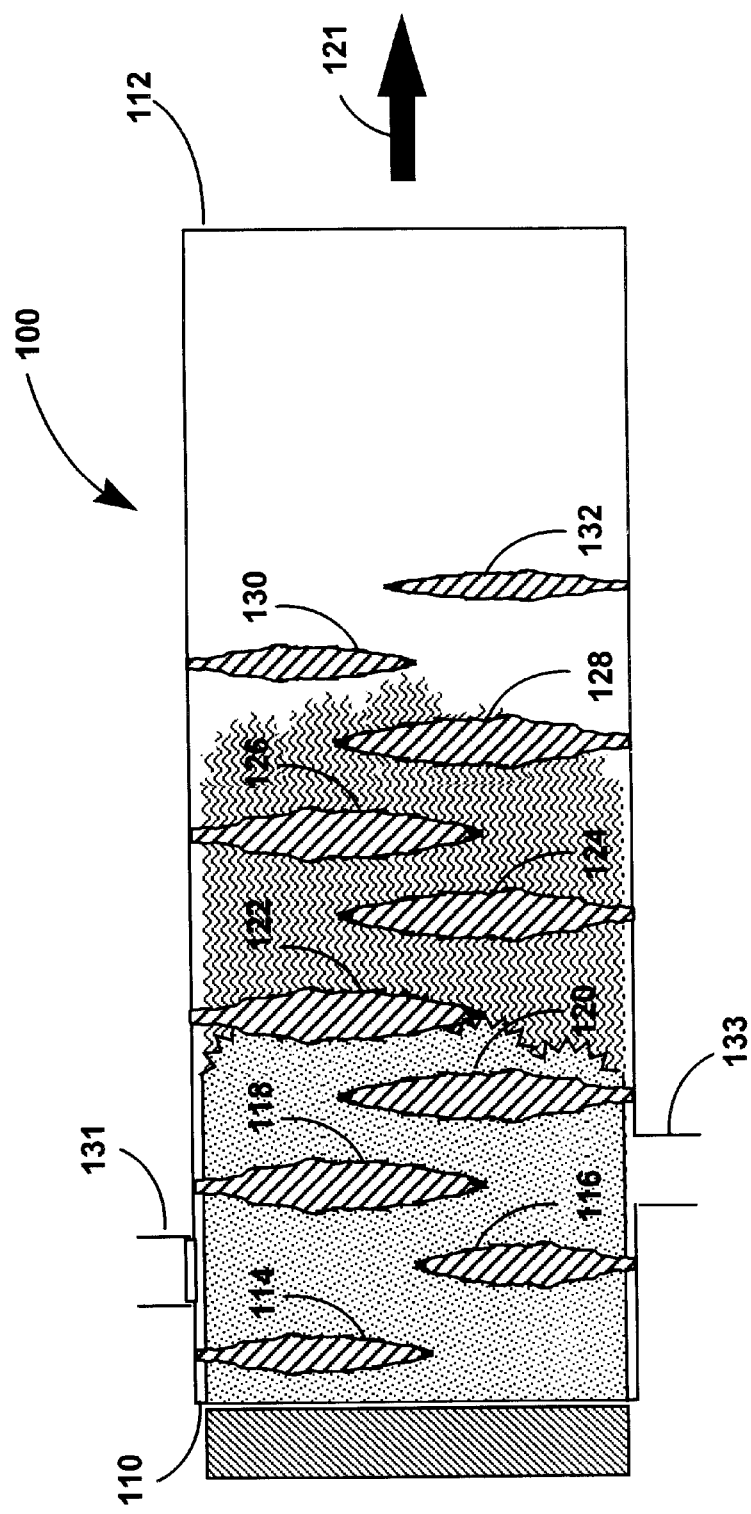
FIG. 3 is a schematic top view of a prior art furnace utilizing only oxy-fuel combustion.

The present invention is best understood in relation to the prior art as represented by FIGS. 1–3. Referring to FIG. 1, a glass melting furnace 10, includes a main furnace portion 12 having a first or charging end 14 with a batch charging device 16 and a second or glass discharge end 18. The overall flow of batch materials and glass through the furnace is indicated by arrow 20. The furnace has a melting zone containing the batch 22 and a fining zone containing the molten glass 24. There is a combustion energy requirement over both the melting zone and the fining zone. Furnace 10 is of the side-port regenerative heating type having regenerators 26 and 28 on either side of the furnace body 12 as is well known in the art. The regenerators are connected to ports 30, 32, 34, 36, 38, 40, 42, 44, 46, 48, 50 and 52 which contain air-fuel burners or air-fuel combustion devices to produce air-fuel flames 54, 56, 58, 60, 62 and 64 as is well known in the art. In firing of the furnace, the air-fuel flames 54, 56, 58, 60, 62 and 64 utilize air 66 which is preheated in regenerator 26. After a period of time, as determined by the furnace heat storage capacity, the flames 54, 56, 58, 60, 62 and 64 are extinguished and like air-fuel flames are produced in ports 42, 44, 46, 48, 50 and 52 utilizing air introduced through regenerator 28. Regenerator 28 has been preheated by gases 68 being exhausted from the furnace. As is well known in the art, the reversing flow alternately heats the regenerator checkers 26, 28 to provide preheated air. In the prior art is has been known to introduce oxy-fuel flames 70, 72 in the middle of the furnace to boost or increase the heating capacity of the furnace and control the batch-line. The oxy-fuel boosting utilizing flames 70, 72 takes place in what is called the hot spot position of the furnace 10.

Referring to FIG. 2, FIG. 2 is identical to FIG. 1 (common features use the same identification) except the oxy-fuel boosting utilizing flames 74 and 76 is performed at the zero port position (i.e. the space between the charge end wall and the first air-fuel port 30) instead of the hot spot position.

Referring to FIG. 3, FIG. 3 shows a glass melting furnace utilizing complete oxy-fuel combustion in order to provide heating of the furnace from a batch end 110 toward a discharge end 112. As indicated by arrow 121, the overall flow of batch materials and glass through the furnace begins at charging end 110 and ends at discharge end 112. Each of the flames represented as 114,116,118,120, 122, 124, 126, 128, 130,132, is produced using oxy-fuel combustion utilizing known oxy-fuel burners. The products of the oxy-fuel combustion are vented through exhausts 131 and 133.

Figure 4:
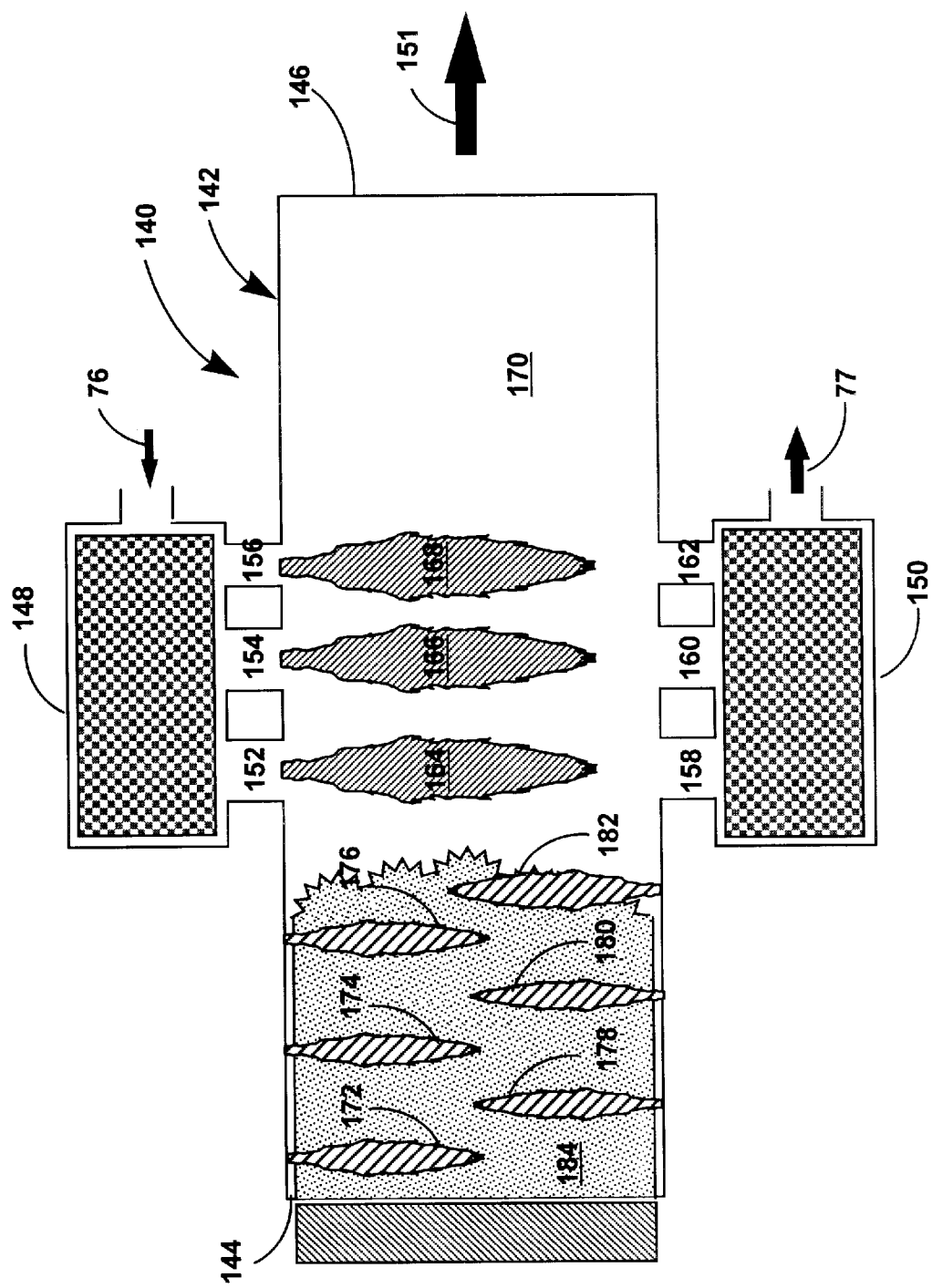
FIG. 4 is a schematic top plan view of a first embodiment of the furnace of the present invention.

Referring to FIG. 4's embodiment of the present invention, a furnace 140 includes a furnace body 142 a charging or batch end 144 and a discharge or molten glass end 146. The overall flow of batch materials and glass through the furnace is indicated by arrow 151. The furnace can have regenerators 148, 150, which are associated with ports 152, 154,156 and 158, 160 and 162. Regenerator 148 receives air 76 and preheats it for the air-fuel combustion flames 164,166,168 respectively. Regenerator 150 is preheated by gases 77 being exhausted from the furnace. The air-fuel combustion flames 164,166 and 168 are positioned over the molten glass in the fining zone 170 of the furnace 140 and provide all of the combustion energy over the fining zone. The oxy-fuel flames 172, 174, 176, 178, 180 and 182 are positioned over the batch materials in the melting zone 184 of the furnace 140 and provide all of the combustion energy over the melting zone.

Figure 5:
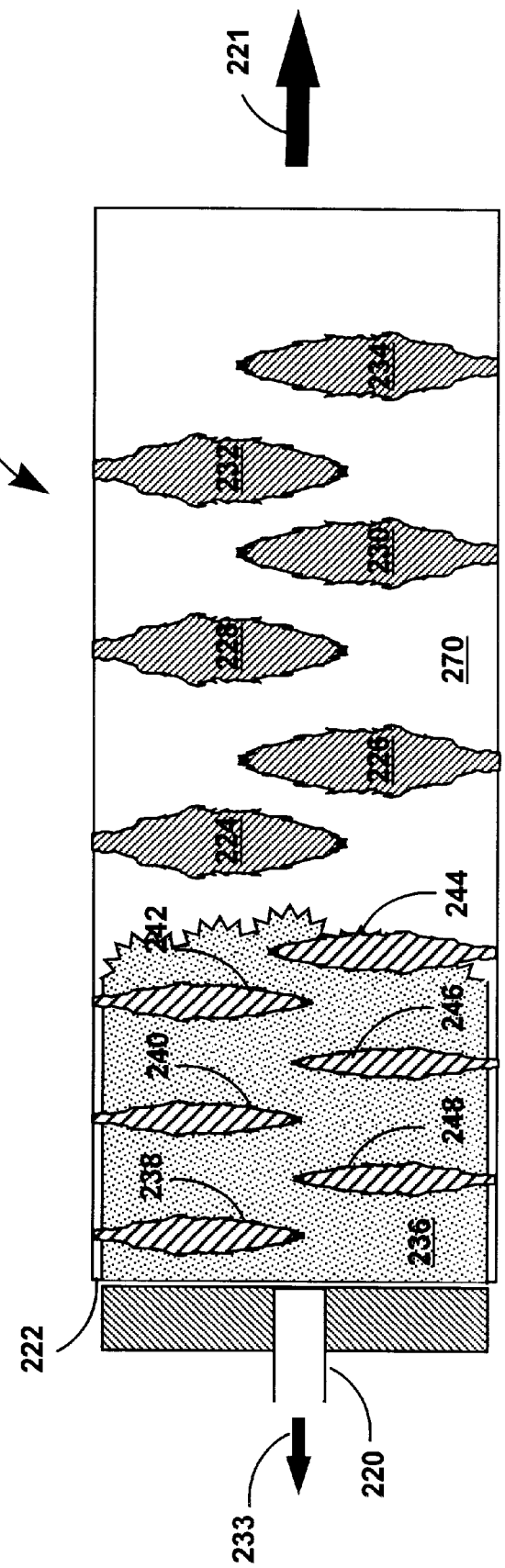
FIG. 5 is a schematic top plan view of a second embodiment of the furnace of the present invention.

Referring to FIG. 5's embodiment of the present invention, FIG. 5 is similar to FIG. 4 except the furnace 200 does not have regenerative heating capacity. Such a furnace 200 is adapted to use recuperative heat recovery wherein the exhaust gases 233 from the furnace are removed via a exhaust 220 disposed at the charging end 222 of the furnace 200. The exhaust gases are conducted to a recuperator which is heated and receives and heats the air used for the air-fuel flames 224, 226, 228, 230, 232 and 234 which are arrayed over the fining zone 270 of the furnace 200 and provide all of the combustion energy over this zone. Oxy-fuel flames 238, 240, 242, 244, 246 and 248 are utilized over the melting zone 236 of the furnace 200 and provide all of the combustion energy over this zone. The overall flow of batch materials and glass through the furnace is indicated by arrow 221.

Figure 6:
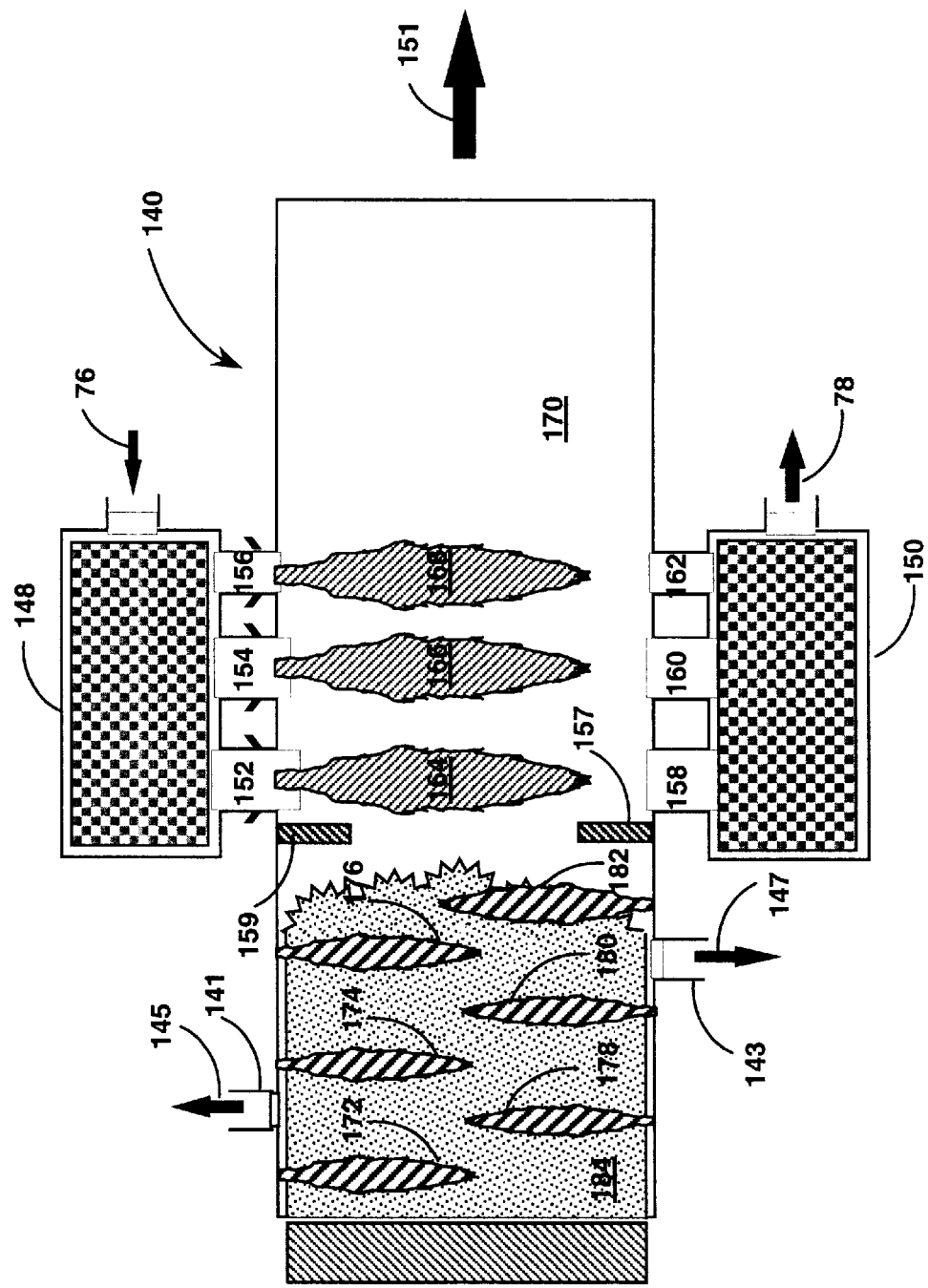
FIG. 6 is a schematic top plan view of a third embodiment of the furnace of the present invention.

Referring to FIG. 6's embodiment of the present invention, FIG. 6 is identical to FIG. 4 (common features use the same identification) except separate auxiliary exhausts 141 and 143 (i.e. separate from the exhaust in regenerator 150 where gases 78 are discharged) are used for exhausting mainly products of the oxy-fuel combustion 145 and 147 from the melting zone. This is done to prevent the batch volatiles which are commingled with the oxy-fuel combustion products from using, and plugging or corroding, the heat recovery device. In FIG. 6, the auxiliary exhausts are shown as being located near the middle of the fining zone. Alternatively, the auxiliary exhausts could be consolidated into a single auxiliary exhaust located at the charging end of the furnace. FIG. 6 also illustrates, as discussed below, the use of partitioning walls 157 and 159 between the melting and fining zones to reduce NOx emissions by impeding the flow of nitrogen (e.g. the nitrogen contained in the air used for air-fuel combustion in the fining zone) from the fining zone into the melting zone.

Figure 7:
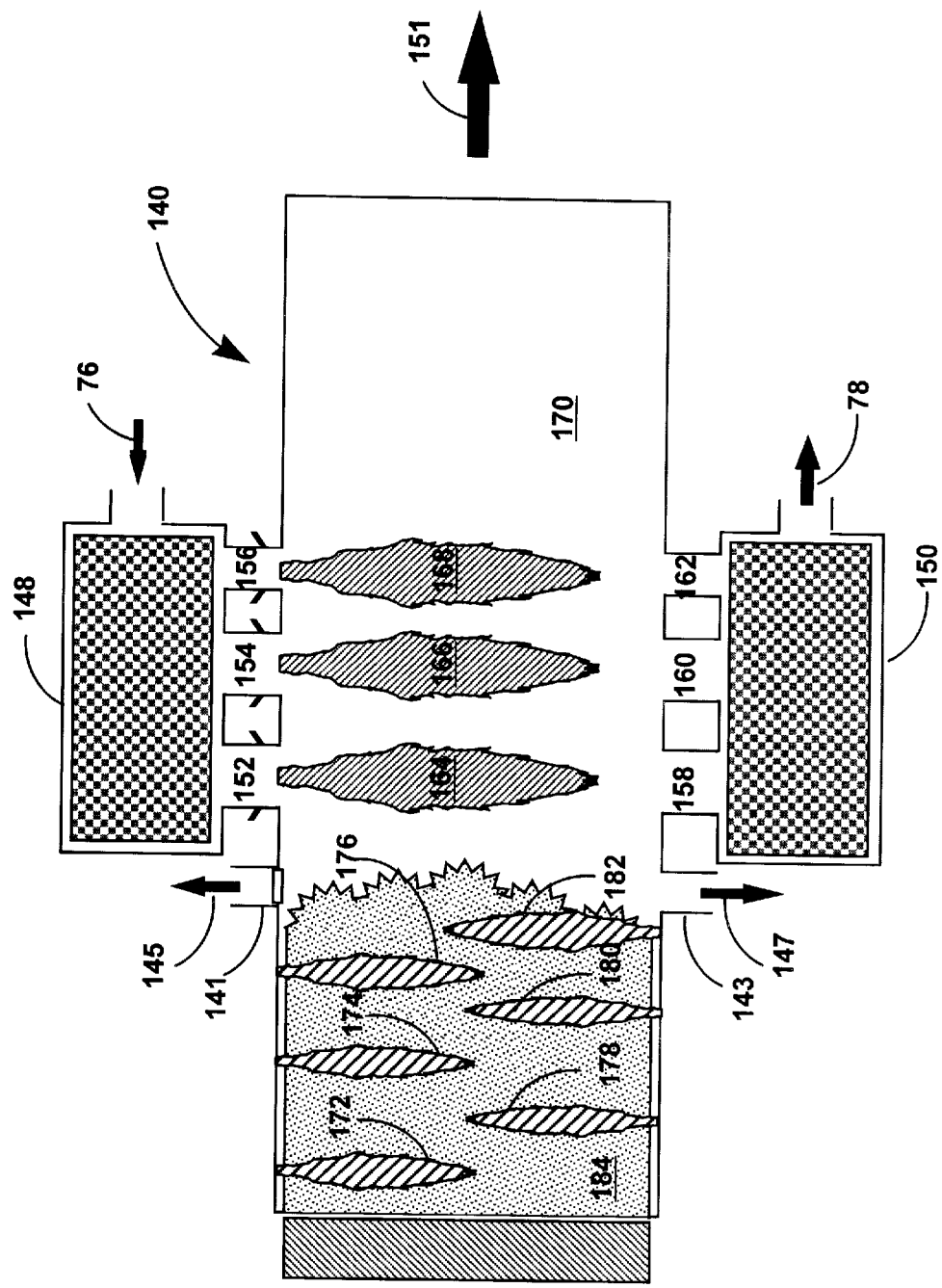
FIG. 7 is a schematic top plan view of a fourth embodiment of the furnace of the present invention.

Referring to FIG. 7's embodiment of the present invention, FIG. 7 is identical to FIG. 6 (common features use the same identification) except the separate auxiliary exhausts 141 and 143 are located at the end of the melting zone which is adjacent to the fining zone in order to help impede products of air-fuel combustion from entering the melting zone.

Figure 8:
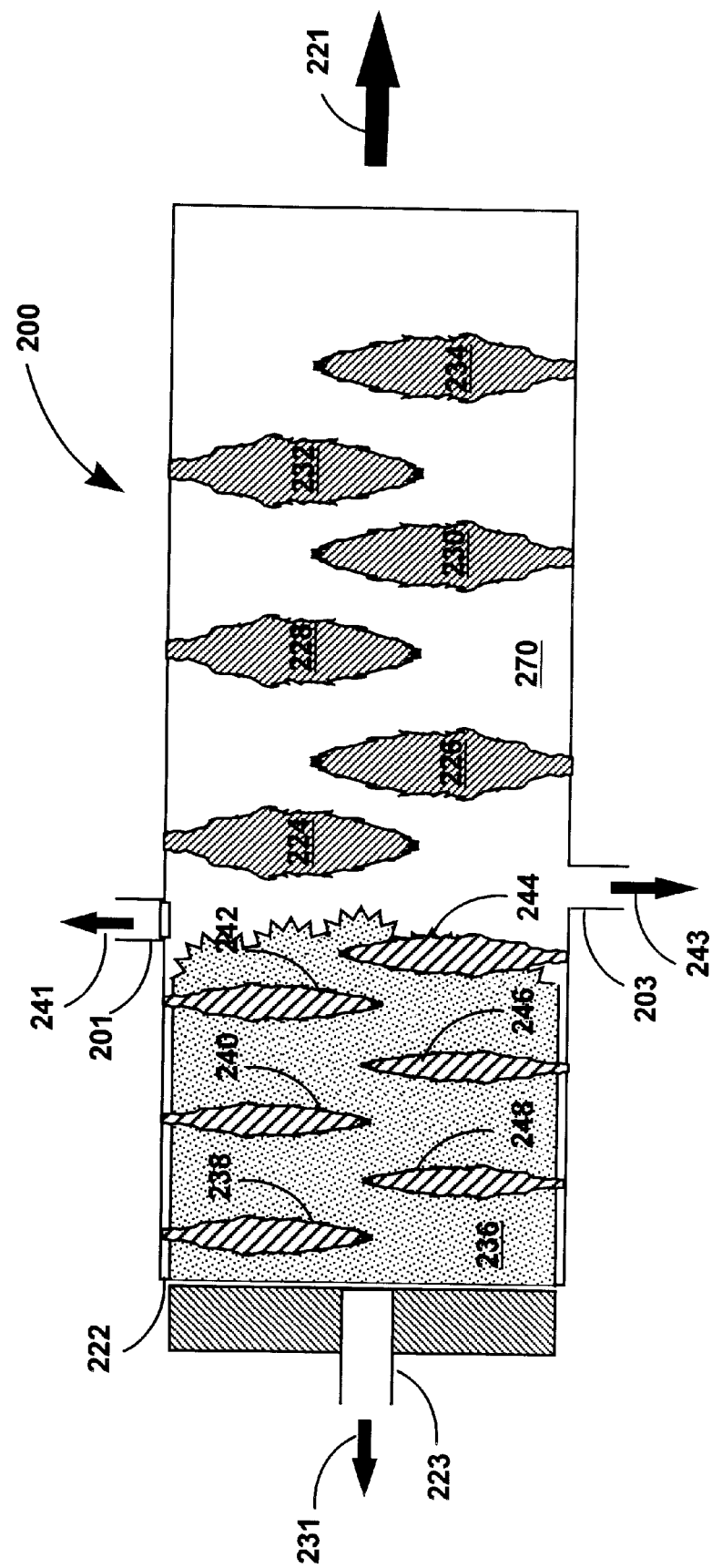
FIG. 8 is a schematic top plan view of a fifth embodiment of the furnace of the present invention.

Referring to FIG. 8's embodiment of the present invention, FIG. 8 is identical to FIG. 5 (common features use the same identification) except (i) separate auxiliary exhaust 223, located at the charging end of the furnace, is used to exhaust oxy-fuel combustion products 231 from the furnace and (ii) there are two exhausts for the recuperative heat recovery device, namely exhausts 201 and 203, which exhausts are used to exhaust air-fuel combustion products 241 and 243 from the furnace. In FIG. 8, the auxiliary exhaust is shown as being located at the charging end of the furnace. Alternatively, this auxiliary exhaust could be divided into two auxiliary exhausts located on either side of the melting zone. And, analogous to FIG. 7's refractory system, such auxiliary exhausts in this recuperative system could be located at the end of the melting zone which is adjacent to the fining zone in order to help impede products of air-fuel combustion from entering the melting zone.

In FIGS. 6, 7 and 8, the individual exhaust pressures of the multiple exhausts are controlled to impede the flow of nitrogen contained in the air used for air-fuel combustion in the fining zone from entering the melting zone. Another option to impede said flow of said nitrogen would be to place a physical barrier (such as the partitioning wall noted in the discussion of FIG. 6 above) between the melting zone and fining zone. The auxiliary exhausts 141 and 143 in FIGS. 6 and 7 and the auxiliary exhaust 223 in FIG. 8 may also be connected to a heat recovery system as would be known to one skilled in the art.

Figure 9:
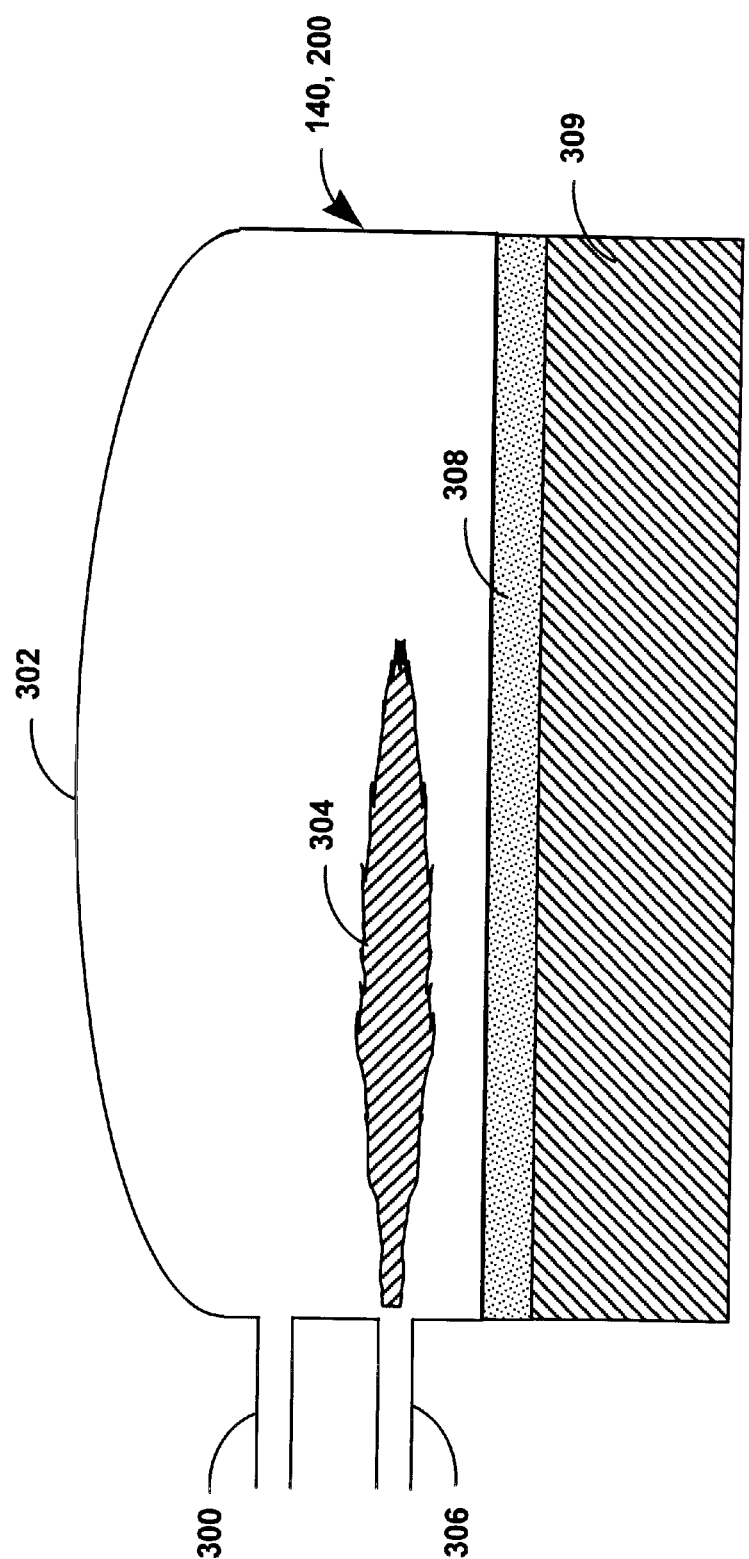
FIG. 9 is a cross-sectional view illustrating a technique for protecting the crown or roof of the furnace of the present invention.

The skilled practitioner will appreciate that a more corrosion resistant refractory need only be used in the oxy-fuel section of the furnace of the present invention, thereby reducing the capital costs. FIG. 9 illustrates an alternative to using a more corrosion resistant refractory in the oxy-fuel section of the furnace of the present invention. FIG. 9 is a cross-sectional view illustrating a technique for protecting the crown, or roof, of either furnace of the present invention 140, 200 whereby a dilution gas is introduced through an upper conduit 300 just below a crown portion 302 of the furnace. (FIG. 9's view of furnace 140, 200 also shows a layer of batch material 308 over a layer of molten glass 309.) In this manner, there is a lower concentration of products of combustion from the oxy-fuel flame 304 (which is produced by introducing oxygen and fuel through conduit 306) which reduces the corrosive effects of an oxy-fuel atmosphere proximate the furnace roof. The dilution gas can consist of air, preheated air, nitrogen, products of air-fuel combustion or mixtures thereof. Air-fuel combustion products could come from introduction of exhaust gases from the air-fuel section of the furnace or created in-situ in the furnace. Like the process disclosed in U.S. Pat. No. 5,755,818, a stratified furnace atmosphere is created.

Unlike the '818 patent, in FIG. 9 an atmosphere high in oxy-fuel combustion products is provided proximate the charge and diluted atmosphere is provided proximate the crown. The process of the '818 patent uses a staged combustion method to form a more oxidizing or a more reducing atmosphere proximate the charge surface than would be the case with a homogeneous furnace atmosphere.

Figure 10:
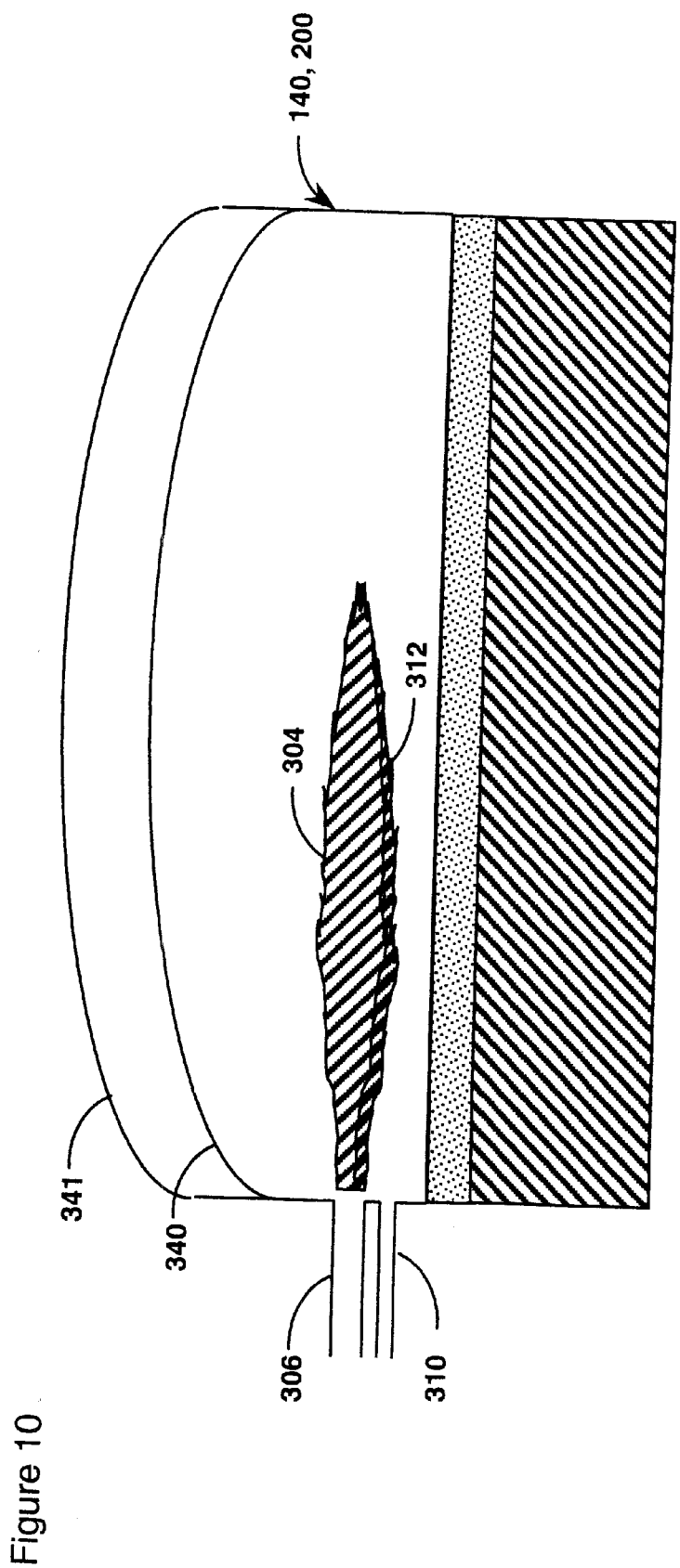
FIG. 10 is a cross-sectional view illustrating the use of oxygen staged combustion in a furnace of the present invention.

FIG. 10 is a cross-sectional view illustrating the use of oxygen staged combustion with either furnace (140, 200). Oxy-fuel burners with oxygen staging as described in U.S. Pat. No. 5,611,682 are preferred for directional heating toward the batch instead of the crown. Referring to FIG. 10, an oxy-fuel flame 304 is produced by introducing oxygen and fuel through conduit 306 and a lower conduit 310 is used to introduce oxygen into the furnace 140, 200 with the oxygen being directed underneath the flame 304. By using oxygen staging with oxygen between the flame and charge as shown in FIG. 10, a region of higher flame temperature 312 on the flame envelope closest to the batch can be obtained resulting in directional heating toward the batch. NOx formation rates have been found to be low when the oxy-fuel burner described in '682 is used, even in furnaces with significant nitrogen concentrations. FIG. 10 also illustrates the use of a lower crown or roof 340 in the melting zone (e.g. as compared to the roof 341 in the fining zone) to reduce NOx emissions by impeding the flow of nitrogen (e.g. the nitrogen contained in the air used for air-fuel combustion in the fining zone) from the fining zone into the melting zone.

The air-fuel section of the furnace of the present invention can include oxygen enhanced combustion technologies familiar to those skilled in the art. The oxygen might be used to make up any oxidant deficiency in an air-fuel port by adding oxygen, improve the overall furnace efficiency, or for NOx reduction techniques familiar to those skilled in the art. General oxygen enrichment of up to 30% or higher, depending on the heat recovery system, can be directly injected into the combustion air stream or strategically placed to oxygen enrich a specific port. Oxygen lancing can be used to achieve higher levels of oxygen enrichment in the flame if desired. Oxygen could also be used in a number of new technologies for improved energy efficiency or NOx reduction such as the disclosed in U.S. Pat. No. 5,725,366.

Figure 11:
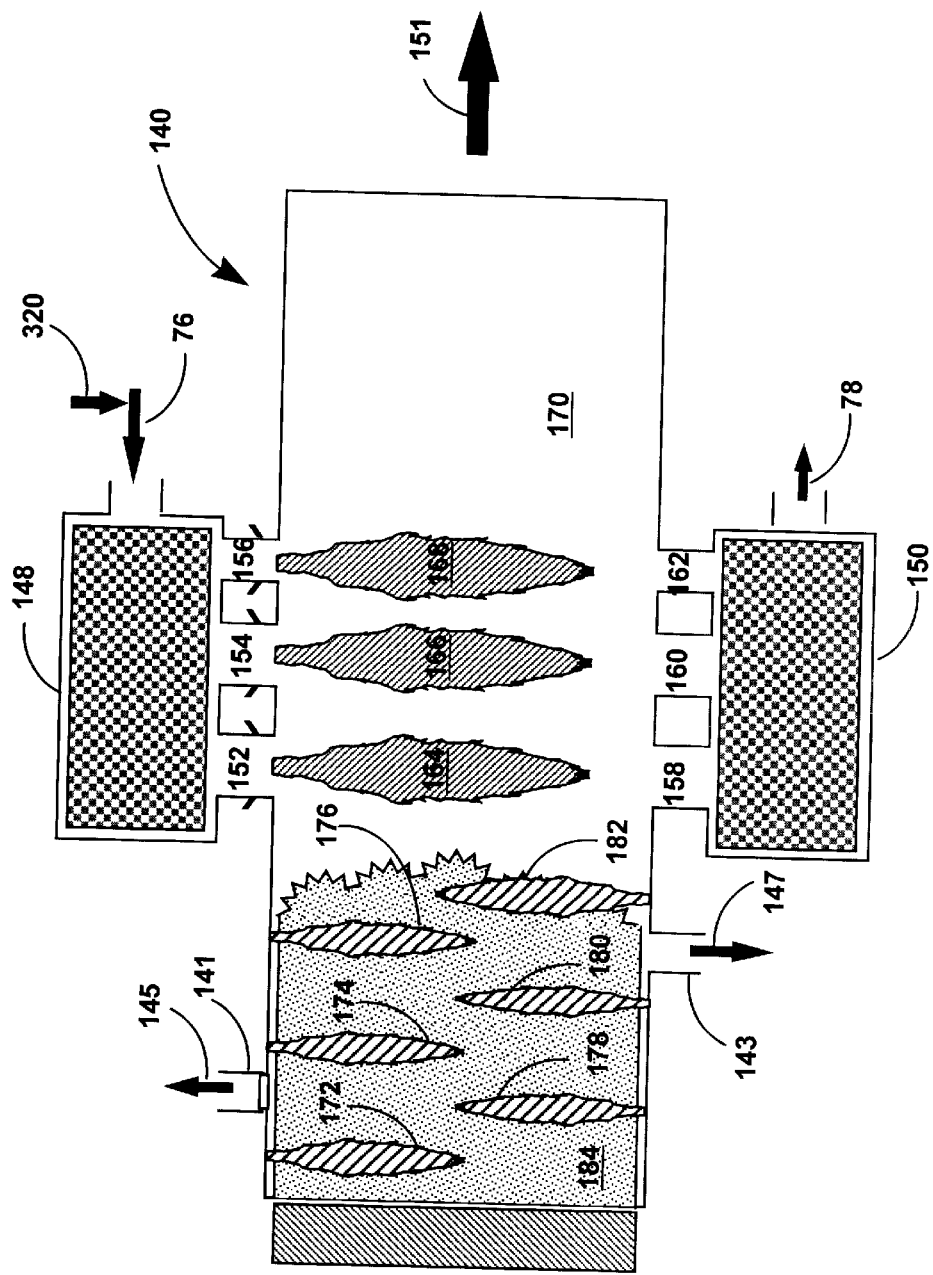
FIG. 11 is a schematic top plan illustrating oxygen enrichment of the combustion air in FIG. 6's embodiment of the furnace of the present invention.

FIG. 11 is a schematic top plan illustrating oxygen enrichment of the combustion air in FIG. 6's embodiment of the furnace of the present invention. Oxygen 320 is introduced into the combustion air 76 prior to introducing the air into regenerator 148 for oxygen enrichment of the air-fuel flames 164, 166 and 168. Although shown in connection with FIG. 6's embodiment which uses regenerative heat recovery, the skilled practitioner will appreciate that oxygen enrichment is equally applicable to FIG. 5's embodiment which uses recuperative heat recovery.

Figure 12:
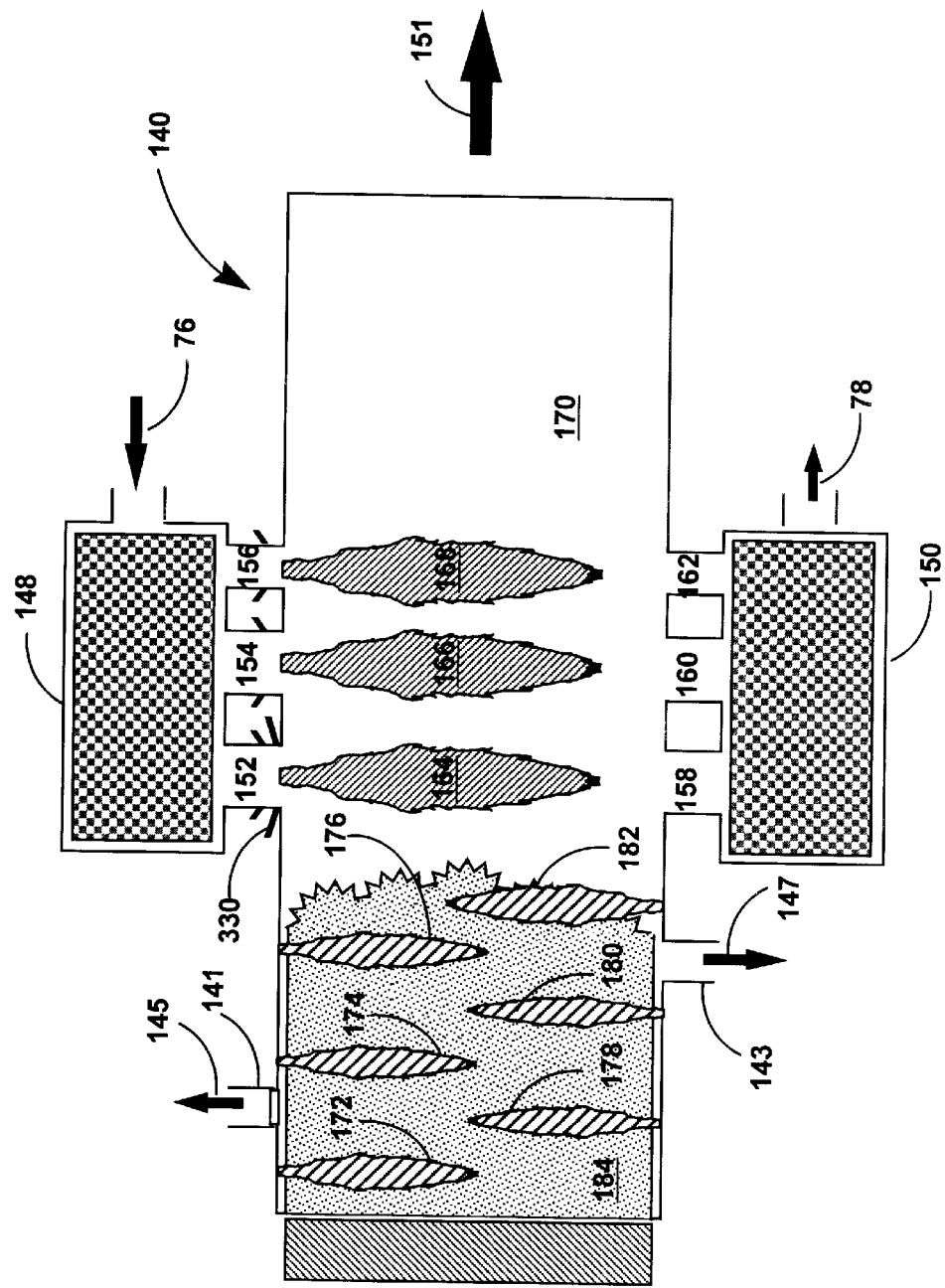
FIG. 12 is a schematic top plan illustrating oxygen lancing of the air-fuel flame in FIG. 6's embodiment of the furnace of the present invention.

FIG. 12 is a schematic top plan illustrating oxygen lancing of the air-fuel flame in FIG. 6's embodiment of the furnace of the present invention whereby introduction of oxygen via an oxygen lance 330 is used to enrich the air-fuel flame 164 in furnace 140. Although shown in connection with FIG. 6's embodiment which uses regenerative heat recovery, the skilled practitioner will appreciate that oxygen lancing is equally applicable to FIG. 5's embodiment which uses recuperative heat recovery.

In another embodiment of the present invention, it is contemplated to angle one or more of the oxy-fuel flames toward the batch at an angle between 0° and 30° from horizontal. This technique is applied also for directional heating toward the batch instead of the crown and placement of the oxy-fuel combustion atmosphere proximate the batch especially in the case of diluting the oxy-fuel atmosphere near the crown with air, preheated air, nitrogen, air-fuel combustion products and mixtures thereof.

In another embodiment of the present invention, it is contemplated to include an advanced control system to manage and optimize the oxygen usage in the furnace. The advanced control system would monitor and control the use of oxygen depending on, for example, the pollutant emissions requirements, variability in the purity and production rate of the oxygen generator, and glass production rate.

In another embodiment of the present invention, it is contemplated to provide a process and furnace for melting glass with low NOx emissions by limiting the flow of nitrogen containing gases from the air-fuel section into the oxy-fuel section. The preferred method to reduce flow from the air-fuel section to the oxy-fuel section is by furnace design where a lower crown height is used in the oxy-fuel section as noted in the discussion of FIG. 10 above. Other methods to reduce flow from the air-fuel section to the oxy-fuel section are to provide a physical barrier (such as a partitioning wall as noted in the discussion of FIG. 6 above) between the air-fuel and oxy-fuel sections, or proper number, size, and placement and pressure control of the furnace exhausts. FIG. 6 illustrates an exhaust layout where flues for exhausting mainly products of oxy-fuel combustion and volatiles from the batch are located between the oxy-fuel section and the air-fuel section. Air-fuel combustion products preferentially exhaust through these exhausts instead of penetrating into the oxy-fuel section. Alternatively, the configuration shown in FIG. 4, with no separate exhausts for the oxy-fuel combustion products and volatiles from the batch could be used to create a higher pressure in the oxy-fuel section and force the flow from the oxy-fuel section into the air-fuel section, thereby minimizing nitrogen concentrations in the oxy-fuel section.

In another embodiment of the present invention, it is contemplated to provide for low NOx emissions through operational techniques. The preferred method is to operate the two oxy-fuel burners closest to the air-fuel section with fuel rich combustion (i.e. with a sub-stoichiometric amount of oxidant), a condition that will be recognized by those skilled in the art to form less NOx. Other burners operating fuel lean, or the use of oxygen lances, allow the furnace to operate stoichiometrically overall. Other operational techniques suitable for NOx reduction are extreme oxygen staging of the oxy-fuel burners. Extreme staging is the practice whereby greater than 50% of the oxygen for combustion for a single burner is provided through a staging port.

In another embodiment of the present invention, it is contemplated to provide air-fuel backup capability of the oxy-fuel section of the furnace in case of oxygen supply disruption. In case of oxygen supply disruption, the oxy-fuel burners can be replaced by suitable air-fuel burners, available through Air Products and Chemicals Inc., Allentown, Pa. Combustion air can be supplied preferably from the preheated air source used in the air-fuel section of the furnace or by a separate air supply with or without preheating.

In another embodiment of the present invention, it is contemplated to place the oxy-fuel burners, exhausts, and air-fuel ports and burners to minimize negative interactions of the flames. Since the oxy-fuel flames in the furnace will typically have lower momentum than the air-fuel flames, the oxy-fuel flames are at greater risk of being disrupted by the air-fuel flames. Disruption of flames can negatively impact flame characteristics (flame stability, flame geometry, area of glass covered by flame, etc.) that result in decreased melting efficiency of the furnace as well as potentially causing physical damage to the furnace. Proper furnace geometry design can be accomplished by experiments, experience, or preferably through the use of computational fluid dynamics modeling. For the case of a regenerative furnace, the oxy-fuel burner, optional oxy-fuel exhaust ports, and air-fuel port configuration must be suitable for the desired operating conditions where the air-fuel combustion is firing from left to right and from right to left. Computational fluid dynamics modeling can be used to evaluate suitable configurations.

In another embodiment of the present invention, it is contemplated to operate the oxy-fuel burners with velocities exiting the burner block of greater than 100 ft/s. The momentum of the oxy-fuel flames must be sufficient to minimize negative impacts of the high momentum air-fuel flames.

The greater usage of steady, constant oxy-fuel firing according to the invention provides greater stability of the batch position and shape, especially in regenerative furnaces, resulting in better glass quality. Because of the reversal cycle in a regenerative air-fuel furnace, the heat flux from the air-fuel flames varies and can impact the movement of the batch. The relatively high velocities from the air-fuel flames may also influence the batch movement. A more stable and controlled batch shape is important for glass melt convection flow patterns and therefore influences glass quality. Batch movement is so important that flat glass furnaces often use mechanical means to control batch movement.

For glass furnaces where heat recovery device fouling/plugging is a problem, the furnace of the present invention can include one or more separate exhausts with limited or no heat recovery for the oxy-fuel products of combustion and volatiles evolved from the batch. If the rate of volatilization of the glass being melted is high, one or more flues not connected with the air-fuel heat recovery device should be installed in the oxy-fuel section of the furnace to exhaust mainly products of the oxy-fuel combustion and volatiles from the batch. A benefit of the present invention is the reduction of heat recovery device fouling and plugging.

Oxygen for oxy-fuel boosted furnaces is typically provided by a liquid bulk supply (LOX) whereas the furnace according to the invention is likely to be supplied by on-site generated oxygen because of the higher oxygen usage rate. On-site oxygen generators are typically sized depending on the maximum demand anticipated during the entire furnace campaign and/or standard engineered equipment designs of the oxygen supplier. Users of the oxy-fuel boost technology have historically only used oxygen in the oxy-fuel burners since LOX is more expensive than an on-site generated oxygen and the greatest benefit is achieved by using the oxygen in this way. Because of the lower oxygen cost of on-site generated oxygen and expected overproduction of oxygen, oxygen is used in the air-fuel section of the furnace according to the present invention to make up any oxidant deficiency for an air-fuel port by adding oxygen. This will improve the furnace temperature control by allowing greater tailoring of fuel distribution, improve the furnace efficiency, or provide NOx reduction through techniques familiar to those skilled in the art. The oxidant supply for the present invention is not limited by the air flow rates or distribution since the oxygen concentration for each port can be controlled using oxygen.

The present invention uses both oxy-fuel combustion and air-fuel combustion preferably with conventional heat recovery, whereas full oxy-fuel utilizes only oxy-fuel combustion. Air-fuel combustion is applied in the section of the furnace where foaming has been reported as an issue in full oxy-fuel furnaces thereby mitigating the amount of foam on the glass surface and improving glass quality.

Standard refractory materials used in air-fuel furnaces can be used in the air-fuel section of the furnace of the present invention. A benefit of using standard air-fuel refractories in the air-fuel section is that they have a proven record for minimizing the addition of defects to the glass. Because the alternative refractories proposed for oxy-fuel are more corrosion resistant, they are also harder to melt out in the glass should pieces of the alternative refractory enter the glass melt either as a liquid or solid. In liquid form, defects known as cord and viscous knots are apparent in the final product. The alternative refractories proposed for oxy-fuel combustion can provide defects to the glass which are more difficult to remove in the overall glass melting process. The air-fuel section according to the present invention is closer to the glass melt exit of the furnace and therefore little additional processing time is available to remove any defects that might be introduced by the down tank (fining zone) refractory.

The oxygen supplied to both the furnace according to the invention and a full oxy-fuel furnace is likely to be from an on-site oxygen generator. On-site oxygen generators are typically sized depending on the maximum demand anticipated during the entire furnace campaign and/or standard engineered equipment designs of the oxygen supplier. For a full oxy-fuel furnace, this often results in incomplete utilization of oxygen produced during some or all of the furnace campaign. Extra oxygen produced from an on-site oxygen generator is often unused in the case of a full oxy-fuel furnace resulting in a cost penalty. Extra oxygen produced on-site can be used in a number of ways. It could be used in the furnace of the invention to improve the furnace temperature control since the furnace operator can better tailor the fuel distribution profile and make up any oxidant deficiency for an air-fuel port by adding oxygen. The oxidant supply for an air-fuel port is not limited by the air flow rates or distribution since the oxygen concentration for each port can be controlled using oxygen. In addition, oxygen can be used to improve the furnace efficiency or for NOx reduction techniques familiar to those skilled in the art. The benefit is better utilization of on-site generated oxygen throughout the whole furnace campaign for a furnace as compared to a full oxy-fuel furnace.

As described in the background section, backup of on-site generated oxygen supply is perceived to be a concern for large full oxy-fuel furnaces and sites with multiple oxy-fuel furnaces. In case of on-site generated oxygen supply disruption, continued operation of a full oxy-fuel furnace will depend on stored liquid oxygen which must be supplied by trucks hauling liquid oxygen from a nearby air separation facility. A benefit of the furnace technology according to the present invention is a reduced dependence on an oxygen supply compared to a full oxy-fuel furnace. In case of oxygen supply disruption, the oxy-fuel burners are replaced by suitable air-fuel burners. The furnace of the invention has a source of preheated combustion air, whereas a full oxy-fuel furnace typically does not. Combustion air can be supplied preferably from the preheated air source used in the air-fuel section of the furnace or by a separate air supply. Because of the heat recovery system, higher furnace production capability in the air-fuel backup mode is possible as compared to air-fuel backup operation of a full oxy-fuel furnace.

The present invention has been described with reference to a number of embodiments thereof. These embodiments should not be viewed as limitations to the present invention, the scope of which should be ascertained by the following claims.

What is claimed is:

1. In a process for melting glass forming ingredients in a furnace by both air-fuel combustion and oxy-fuel combustion wherein:
   (a) the furnace has a charging end, a discharge end, a melting zone adjacent the charging end and a fining zone adjacent the discharge end;
   (b) the glass forming ingredients are introduced into the melting zone, travel along a path from the melting zone to the fining zone and are withdrawn as molten glass from the fining zone; and
   (c) there is a combustion energy requirement over both the melting zone and the fining zone; and
   (d) the oxy-fuel combustion is provided by at least one oxy-fuel burner producing an oxy-fuel combustion flame directed toward the glass forming ingredients at an angle between 0° and 30° to the horizontal; and
   (e) the air-fuel combustion is provided by at least one air-fuel burner producing an air-fuel combustion flame; the improvement comprising:
       (i) providing a majority of the combustion energy over the melting zone by oxy-fuel combustion where the oxidant is between 50 and 100% oxygen; and
       (ii) providing a majority of the combustion energy over the fining zone by air-fuel combustion where the oxidant is between about 21% and 30% oxygen.

2. The process of claim 1 wherein greater than 70% and up to and including 100% of the combustion energy over the melting zone is provided by oxy-fuel combustion.

3. The process of claim 1 wherein greater than 70% and up to and including 100% of the combustion energy over the fining zone is provided by air-fuel combustion.

4. The process of claim 2 wherein greater than 70% and up to and including 100% of the combustion energy over the fining zone is provided by air-fuel combustion.

5. The process of claim 1 wherein the air for the air-fuel combustion is preheated by a heat recovery device and wherein the heat recovery device has an exhaust.

6. The process of claim 5 wherein the heat recovery device is a regenerative heat recovery device.

7. The process of claim 5 wherein the heat recovery device is a recuperative heat recovery device.

8. The process of claim 5 wherein there is at least one auxiliary exhaust in the melting zone for exhausting mainly products of the oxy-fuel combustion from the melting zone.

9. The process of claim 8 wherein the at least one auxiliary exhaust is located adjacent to the fining zone.

10. The process of claim 8 wherein the individual exhaust pressures of the heat recovery device exhaust and the at least one auxiliary exhaust are controlled to impede the flow of nitrogen contained in the air used for the air-fuel combustion in the fining zone from entering the melting zone.

11. The process of claim 1 wherein the furnace has a physical barrier between the melting zone and fining zone to impede the flow of nitrogen contained in the air used for the air-fuel combustion in the fining zone from entering the melting zone.

12. The process of claim 1 wherein the oxy-fuel combustion is provided by at least one oxy-fuel burner producing an oxy-fuel combustion flame and wherein the air-fuel combustion is provided by at least one air-fuel burner producing an air-fuel combustion flame.

13. The process of claim 1 wherein the oxy-fuel combustion is provided by a plurality of oxy-fuel burners and wherein a sub-stoichiometric amount of oxidant is introduced to at least one of the oxy-fuel burners adjacent to any air-fuel combustion flames.

14. The process of claim 1 wherein, in response to an interruption in oxygen supply, at least one of the said at least one oxy-fuel burner is replaced with a substitute air-fuel burner to maintain the temperature in the furnace.

15. The process of claim 14 wherein preheated air is supplied to said at least one air-fuel burner and substitute air-fuel burner from at least one common heat recovery device.

16. The process of claim 1 wherein an auxiliary gas is introduced between the oxy-fuel flame and the roof of the furnace to dilute the furnace atmosphere containing oxy-fuel combustion products proximate the furnace roof.

17. The process of claim 16 wherein the auxiliary gas is selected from the group consisting of air, preheated air, nitrogen, air-fuel combustion products and mixtures thereof.

18. The process of claim 12 wherein the oxy-fuel combustion flame is directed toward the glass forming ingredients at an angle between 0° and 30° to the horizontal.

19. The process of claim 1 wherein the oxy-fuel combustion is provided by at least one oxy-fuel burner with oxygen staging and at least 50% of the oxygen for the at least one oxy-fuel burner with oxygen staging is directed through a staging port in the burner.

20. The process of claim 1 wherein the air for the combustion flame is enriched with up to 50% by volume oxygen.

21. The process of claim 1 wherein the air-fuel flame is enhanced with oxygen.

22. The process of claim 21 wherein a lance is used to introduce oxygen to the air-fuel flame for enhancing the air-fuel flame.

23. A furnace for melting glass forming ingredients comprising:
   (a) a charging end, a discharge end, a melting zone adjacent the charging end and a fining zone adjacent the discharge end;
   (b) means for introducing the glass forming ingredients into the melting zone;
   (c) means for withdrawing the glass forming ingredients as molten glass from the fining zone;
   (d) at least one oxy-fuel burner producing an oxy-fuel combustion flame directed toward the glass forming ingredients at an angle between 0° and 30° to the horizontal wherein said at least one oxy-fuel burner provides a majority of the combustion energy requirement over the melting zone by oxy-fuel combustion where the oxidant is between 50 and 100% oxygen; and
   (e) at least one air-fuel burner producing an air-fuel combustion flame wherein said at least one air-fuel burner provides a majority of the combustion energy requirement over the fining zone by air-fuel combustion where the oxidant is between about 21% and 30% oxygen.

24. The furnace of claim 23 wherein greater than 70% and up to and including 100% of the combustion energy over the melting zone is provided by oxy-fuel combustion.

25. The furnace of claim 23 wherein greater than 70% and up to and including 100% of the combustion energy over the fining zone is provided by air-fuel combustion.

26. The furnace of claim 24 wherein greater than 70% and up to and including 100% of the combustion energy over the fining zone is provided by air-fuel combustion.

27. The furnace of claim 23 further comprising a regenerative heat recovery device to preheat the air for the air-fuel combustion wherein the heat recovery device has an exhaust.

28. The furnace of claim 27 wherein the heat recovery device is a regenerative heat recovery device utilizing reversal cycles and wherein the furnace further comprises a means to permit continuous operation of the oxy-fuel combustion during all stages of the air-fuel combustion, including reversal cycles of the regenerative heat recovery device.

29. The furnace of claim 27 wherein the heat recovery device is a recuperative heat recovery device.

30. The furnace of claim 27 further comprising at least one auxiliary exhaust in the melting zone for exhausting mainly products of the oxy-fuel combustion from the melting zone.

31. The furnace of claim 30 wherein the at least one auxiliary exhaust is located adjacent to the fining zone.

32. The furnace of claim 30 further comprising a means for controlling the individual exhaust pressures of the heat recovery device exhaust and the at least one auxiliary exhaust to impede the flow of nitrogen contained in the air used for the air-fuel combustion in the fining zone from entering the melting zone.

33. The furnace of claim 23 further comprising a physical barrier between the melting zone and fining zone to impede the flow of nitrogen contained in the air used for the air-fuel combustion in the fining zone from entering the melting zone.

34. The furnace of claim 23 wherein the means for providing the oxy-fuel combustion over the melting zone comprises at least one oxy-fuel burner producing an oxy-fuel combustion flame and wherein the means for providing the air-fuel combustion over the fining zone comprises at least one air-fuel burner producing an air-fuel combustion flame.

35. The furnace of claim 23 wherein the means for providing the oxy-fuel combustion comprises a plurality of oxy-fuel burners and wherein a sub-stoichiometric amount of oxidant is introduced to at least one of the oxy-fuel burners adjacent to any air-fuel combustion flames.

36. The furnace of claim 23 further comprising a means for introducing an auxiliary gas between the oxy-fuel flame and the roof of the furnace to dilute the furnace atmosphere containing oxy-fuel combustion products proximate the furnace roof.

37. The furnace of claim 34 further comprising a means for directing the oxy-fuel combustion flame toward the glass forming ingredients at an angle between 0° and 30° to the horizontal.

38. The furnace of claim 23 wherein the roof of the furnace over the melting zone is lower than the roof of the furnace over the fining zone.

* * * * *